United States Patent [19]

Miro et al.

[11] Patent Number: 4,626,519

[45] Date of Patent: Dec. 2, 1986

[54] SUPPORTED POLYOLEFIN CATALYST COMPONENTS AND METHODS OF MAKING AND USING SAME

[75] Inventors: Nemesio D. Miro, North Brunswick, N.J.; Floyd E. Farha, Bartlesville, Okla.; Charles E. Capshew, Houston, Tex.

[73] Assignee: Phillips Petroleum Company, Bartlesville, Okla.

[21] Appl. No.: 773,164

[22] Filed: Sep. 6, 1985

[51] Int. Cl.[4] .......................... C08F 4/62; C08F 4/64; C08F 4/68

[52] U.S. Cl. .................................. 502/105; 502/113; 502/121; 502/122; 502/123; 502/124; 502/125; 502/126; 502/127; 526/139; 526/140; 526/141; 526/142

[58] Field of Search ............... 502/105, 113, 121, 122, 502/123, 124, 125, 126, 127, 132, 134

[56] References Cited

U.S. PATENT DOCUMENTS

| | | | |
|---|---|---|---|
| 3,135,889 | 6/1964 | Bosmajian | 502/103 X |
| 3,492,281 | 1/1970 | Smith et al. | 502/127 X |
| 3,850,899 | 11/1974 | Wada et al. | 502/127 X |
| 4,127,505 | 11/1978 | Ueno et al. | 502/107 |
| 4,347,158 | 8/1982 | Kaus et al. | 502/105 |
| 4,555,496 | 11/1985 | Agapiou et al. | 502/105 |

FOREIGN PATENT DOCUMENTS 101615  2/1984  European Pat. Off. .

*Primary Examiner*—Patrick P. Garvin
*Attorney, Agent, or Firm*—French & Doescher

[57] ABSTRACT

A highly active catalyst suitable for the polymerization of olefins and its use are disclosed, said catalyst being prepared by (1) co-comminuting an aluminum halide; at least one electron donor; a Group IVB-VIB transition metal compound; and a support base selected from the group consisting of the Group IIA and IIIA salts and the salts of the multivalent metals of the first transition series with the exception of copper to produce a coground solid;
(2) extracting said coground solid with an organic liquid; and
(3) separating the solid from the liquid under such conditions that at least 5 weight percent of the aluminum in the coground solid is removed.

26 Claims, No Drawings

SUPPORTED POLYOLEFIN CATALYST COMPONENTS AND METHODS OF MAKING AND USING SAME

The present invention relates to a novel catalyst for the polymerization of olefins. In another aspect the invention relates to the use of said catalyst in the polymerization of olefins.

Organometallics have been used in combination with transition metal compounds to catalyze the production of high molecular weight polymers from ethylene and alpha-olefins to produce polymers having high stereoregularity.

The basic catalysts used in these methods are formed by combining a transition metal salt with a metal alkyl or hydride. Titanium trichloride and an aluminum alkyl, such as triethyl aluminum or diethyl aluminum chloride, are often used. However, such catalysts generally have low productivity and produce polymer with low stereoregularity.

Isotactic polypropylene results from a head-to-tail linkage of the monomer units resulting in the asymmetric carbon atoms all having the same configuration. The isotactic index is a measure of the precentage of isotactic isomer in the polymer. Atactic polypropylene results from random linkage of the monomer units. Isotactic polypropylene is a highly useful commercial product having high tensile strength, hardness, stiffness, resilience, clarity and better surface luster. Polypropylene finds extensive commercial use in injection molding, film, sheeting, filament and fiber applications. Commercially useful polypropylene contains essentially the stereoregular or isotactic isomer.

For most applications, the polymer produced using these basic catalysts must be extracted to remove the atactic (non-stereoregular) polymer to increase the percentage of isotactic (stereo-regular) polymer in the final product. It is also necessary to deash polymer produced by this method to remove catalyst residues. The additional production steps of polymer extraction and polymer deashing add significantly to the cost of polymer produced with these basic catalysts.

A particularly useful high activity catalyst is disclosed in U.S. Pat. No. 4,347,158, the disclosure of which is incorporated herein by reference. One particularly preferred embodiment of the invention of that patent involves a solid titanium-containing catalyst component prepared by the co-comminution of magnesium chloride, aluminum chloride, an aromatic ester, an aromatic ether, and titanium tetrachloride. Although such catalysts have been found to be very active in the polymerization of olefins, obviously improvements in activity, selectivity to isotactic polymer, and bulk density are always desirable.

European Published Application No. 101,615 discloses some improved versions of catalysts of the type disclosed in U.S. Pat. No. 4,347,158.

Among the objects of the present invention is to provide catalysts which will provide improvements over some of the closely related catalyts of U.S. Pat. No. 4,347,158 or European Published Application No. 101,615, the disclosure of which is also incorporated herein by reference.

SUMMARY OF THE INVENTION

The catalyst of the present invention comprises the solid product prepared by (1) co-comminuting an aluminum halide; at least one electron donor; a Group IVB–VIB transition metal compound; and a support base selected from the group consisting of the Group IIA and IIIA salts and the salts of the multivalent metals of the first transition series with the exception of copper to produce a coground solid;

(2) extracting said coground solid with an organic liquid; and (3) separating the solid from the liquid under conditions such that at least 5 weight percent of the aluminum in the coground solid is removed.

In referring to the extraction of the aluminum the percentages are based on the weight of aluminum rather than the weight of the solid catalyst. In other words, it is required that at least 5 weight percent of the aluminum, calculated as elemental metal, be removed from the coground solid by the extraction and separation steps. The amount of Al removed can be determined by determining the amount of Al that is in the liquid after the separation of the solid from the liquid. In a particularly preferred method the catalyst is also contacted with additional polymerization active metal either after or simultaneous with the extraction.

DETAILED DESCRIPTION OF THE INVENTION

The term co-comminuting is used herein to refer to the co-grinding or co-pulverization of the components. This term is used to distinguish over a simple mixing which does not result in any substantial alteration of the particle size of the components of the mixture.

The support base can be viewed as forming the nucleus of the catalyst. Included within the scope of the salts referred to above for use as the support base are the halogen-containing compounds of magnesium, manganese, zinc, and calcium. Specific examples of such compounds include magnesium chloride, magnesium bromide, manganese chloride, manganese bromide, calcium chloride, zinc chloride, magnesium hydroxychloride, complexes of the same with trialkylaluminums such as triethylaluminum, and complexes of the above with electron donors. It is currently believed that the best support bases are the salts of magnesium and manganese. Typical examples of such salts include the magnesium and manganese dihalides, alkyloxides, aryloxides, and combinations thereof. The preferred support bases are $M(OR)_n X_{2-n}$ where M is magnesium or manganese, R is an alkyl or aryl radical, X is a halide or pseudohalide and n is 0, 1, or 2. Some typical examples of salts having such formula are $MgCl_2$, $MgBr_2$, $MgF_2$, $Mg(OCH_3)_2$, $Mg(OCH_2CH_3)_2$, $Mg(OC_6H_5)_2$. It is within the scope of the invention to employ mixtures of such salts. The currently most preferred embodiments employ magnesium halides, especially magnesium dichloride.

Because the catalyst component is water and air reactive it is necessary to insure that the water content of the support base is sufficiently low so as not to interfere with the catalytic activity. For this reason, when magnesium chloride is used as a support base it should preferably be substantially anhydrous. Anhydrous magnesium chloride may be prepared by drying under an HCl blanket at a temperature of 350° C.

In another embodiment of the invention a dehydrating agent such as the silicon tetrahalides or calcium hydride may be added to and co-comminuted with a water containing support base prior to production of the catalyst component. The dehydrating agent becomes a part of the support base. In a preferred embodiment, silicon tetrachloride is used for this purpose. Silicon tetrachloride effectively dehydrated a water containing magnesium chloride support base and surprisingly had no apparent effect on the activity of the resulting catalyst. It is preferred that the molar ratio of dehydrating agent to water present in the support base be about one to one.

The term aluminum halide is used to refer to aluminum compounds having at least one halogen bonded directly to the aluminum.

Examples include $AlCl_3$, Al-dichloro-phenoxy, Al-mono-chloro-diphenoxy, Al-dichloro-xylenoxy, Al-mono-chloro-dixylenoxy, Al-dichloro-2,6-t-butyl-p-cresoxy, Al-dichloro-octoxy, Al-monoethyl-dichloride, Al-siloxyl-chloride, and the like.

Examples of electron donors include organic compounds having at least one atom of oxygen, sulfur, nitrogen, or phosphorus to function as the electron donor. More specifically, the term electron donor is used to include ethers, esters, ketones, aldehydes, alcohols, carboxylic acids, phenols, thioethers, thioesters, thioketones, amines, amides, nitriles, isocyanates, phosphites, phosphoryl compounds, and phosphines. Typically it is preferred to use compounds having no more than 16 carbon atoms per molecule. It is currently believed that aromatic ethers and the esters of aromatic acids are the most useful electron donors.

In an especially preferred embodiment both an aromatic ester and an aromatic ether are employed. The more common esters are those derived from carboxylic acids having 1 to 12 carbon atoms and alcohols having 1 to 12 carbon atoms. The more common ethers are those containing 2 to 12 carbon atoms and 1 to 10 ether oxygen atoms. Typical examples of the aromatic esters include the alkyl and aryl esters of aromatic carboxylic acids such as benzoic, toluic, p-methoxybenzoic, and phthalic acid. Some specific examples include ethyl benzoate, methyl benzoate, methyl-p-toluate, ethyl-p-toluate, and methyl-anisate. The term aromatic ethers is intended to include those ethers having two aromatic groups as well as those having one aromatic group and one alkyl group. Some specific examples include anisole, phenetole, diphenyl ether, phenylallyl ether, and benzofuran. The currently most preferred combination is ethyl benzoate and anisole.

Group IVB-VIB transition metal compounds include tri-, tetra-, and penta-valent transition metal compounds. Examples include compounds of the formula $MO_p(OR)_m-X_{n-2p-m}$ wherein M is the Group IVB-VIB metal with valency of n=3, 4 or 5, O is oxygen, p is 0 or 1, R is an alkyl, aryl, cycloalkyl group or substituted derivative thereof, X is a halide and $0 \leq m = n$. In practice, the transition metal is generally selected from the group consisting of titanium, vanadium, chromium and zirconium. In the preferred embodiment, the transition metal is tetra-valent titanium. The choice of a particular transition metal compound within the above formula will depend upon the reaction conditions and other constituents present in the catalyst. Some examples of transition metal compounds having polymerization activity are $TiCl_4$, $Ti(OCH_3)Cl_3$, $Ti(OCH_2CH_3)Cl_3$, $VCl_3$, $VOCl_2$, $VOCl_3$ and $VO(OCH_3)Cl_2$. In the preferred embodiment liquid titanium tetrachloride is used as the active transition metal compound.

Typically the molar ratio of the support base to the aluminum chloride is in the range of about 8/1 to 8/2, more preferably in the range of about 8/1 to 8/1.5. The molar ratio of the support base to the electron donor would typically be in the range of about 8/0.5 to 8/3, more preferably in the range of about 8/1 to 8/3. The molar ratio of the support base to the transition metal compound would typically be in the range of about 8/0.1 to 8/1, more preferably about 8/0.4 to 8/0.6.

In the especially preferred embodiment in which an aromatic ester and an aromatic ether are both employed in making the solid catalyst the aromatic ester is typically employed in a molar amount at least equivalent to that of the coground transition metal compound. More typically, the molar ratio of the aromatic ester to the transition metal compound would be in the range of about 1.5/1 to 3/1.

The co-comminution of the components can be carried out in any order. The components can be added one at a time with additional comminution with each newly added component or several of the components can be combined first and comminuted simultaneously. It is also possible to combine some of the components before combining them with a comminuted product. The currently favored technique, however, involves co-comminuting the support base and the aluminum halide, then co-comminuting that product with electron donor, and then co-comminuting that product with the transition metal compound.

The preferred method of producing the above catalyst component comprises the co-comminution of the constituents under an inert atmosphere in a ball or vibration mill. The support base is initially charged into the mill. If the support base contains water which must be removed, a sufficient quantity of dehydrating agent is initially added to the support base and the resulting mixture co-comminuted at temperatures between about 0° C. and about 90° C. for from about 15 minutes to about 48 hours. Preferably this mixing is for from about 6 hours to about 24 hours, optimally for about 15 hours, at temperatures between about 35° C. and about 50° C.

Although co-comminution may take place at temperatures between about 0° C. and about 90° C. the preferred mixing temperature is from about 25° C. to about 50° C., a temperature of 30° C. being particularly preferred. Mixing times may range from about 15 minutes to about 48 hours. Preferred mixing times are from about 12 hours to about 20 hours, with optimal mixing at about 16 hours. Insufficient mixing will not yield a homogeneous compound, while overmixing may cause agglomeration or may significantly decrease particle size of the catalyst component, causing a direct reduction in particle size of the polypropylene produced from the catalyst component.

In an alternative embodiment a support base containing water, the dehydrating agent and the aluminum halide are charged into the ball or vibration mill together and co-comminuted at temperatures between about 0° C. and about 90° C. for from about 15 minutes to about 48 hours. Preferably this mixing is for from about 12 hours to about 20 hours, optimally about 16 hours, at temperatures between about 35° C. and about 50° C.

In the preferred embodiment a first electron donor is co-comminuted with the support base, aluminum halide and dehydrating agent, if used, to produce an enhanced support. Mixing may be at temperatures between about 0° C. and about 90° C. for from about 30 minutes to about 48 hours. The preferred mixing temperatures are from about 25° C. to about 50° C. for from about one hour to about 5 hours.

To the enhanced support produced as described above is added the active transition metal compound. Although many transition metal compounds of the formula $MO_p(OR)_mX_{n-2p-m}$ as described above will provide satisfactory catalyst components, liquid titanium tetrachloride in the preferred active compound. Such an active transition metal compound is added to the ball or vibration mill and co-comminuted therein with the enhanced support. This mixing may be at temperatures from about 0° C. to about 90° C. and for from about 15 minutes to about 48 hours. It is preferred that this mixing take place at temperatures ranging from about 25° C. to about 50° C. and for from about 12 hours to about 20 hours, optimally for about 16 hours, to produce the supported high efficiency catalyst component.

In an alternative embodiment of the invention a second electron donor which may be different from or the same as the first electron donor may be co-comminuted with the enhanced support prior to addition of the active transition metal compound. The molar ratio of the support base to the second electron donor would typically be in the range of about 8/0.5 to 8/3, more preferably about 8/1 to 8/1.5. In a preferred embodiment ethyl benzoate is employed to make the enhanced support and then anisole is co-comminuted in the ball or vibration mill with the enhanced support at temperatures from about 0° C. to about 90° C. for from about 15 minutes to about 48 hours prior to addition of titanium tetrachloride. However, the preferred mixing is at from about 25° C. to about 50° C. for from about one hour to about 5 hours, optimally about 3 hours.

In another alternative embodiment of the invention, the electron donor, i.e., ethyl benzoate, may be premixed with the active transition metal compound, e.g., titanium tetrachloride, prior to the addition of the transition metal compound to the support. This complex is then mixed with the support under the conditions and for the time specified above for the active transition metal compound.

Although it is preferred that all of the above steps be performed in a ball or vibration mill or similar device in the absence of an additional liquid diluent or solvent, it is also possible to carry out the co-comminution in the presence of such. Such solvents may be inert, such as n-heptane, or may be an excess of titanium tetrachloride.

It is also within the scope of the present invention to include other solids that basically act as solid diluents. Examples of such solids include lead dichloride, tin dichloride, aluminum oxide, silicium oxide, tin oxides, titanium dioxide, zirconium dioxide, aluminum sulphate, aluminum stearate, aluminum phosphate, durene, hexamethylbenzene, anthracene, naphthalene, biphenyl and phenanthrene, and the like.

The solid obtained as described above is then contacted with a liquid under conditions sufficient to extract aluminum from the solid. The extent of the extraction can vary depending upon the extent of activity desired. Typically it is preferred to extract to provide a reduction in aluminum of at least 10%, more preferably at least 25%, and still more preferably in the range of about 35–50%, by weight, based on the amount of Al in the coground solid. Typically, the extraction is carried out to give substantially optimum activity. Preferably the slurry is stirred during the extraction.

The amount of extraction liquid employed can vary but, typically, it would be employed in such an amount that the resulting slurry would contain about 15 to about 60 weight percent solids based on the weight of the liquid, more preferably about 25 to about 50 weight percent.

The actual temperature and time for the extraction can vary depending upon the results desired. Typically the extraction would be conducted at a temperature in the range 30° C. to about 120° C. Generally, however, the temperature should be kept below the boiling point of the liquid having the lowest boiling point. It is currently preferred to use a temperature in the range of about 70° C. to about 100° C., more preferably 90° C. to 100° C. At this temperature when the solid catalyst is employed in an amount equal to about 25 to 35 percent of the weight of the liquid, it is currently preferred to contact the catalyst with the liquid at a temperature in the range of about 90° C. to about 100° C. for about 1 to 6 hours, most preferably about 2 hours.

Any suitable organic compounds can be employed as the extraction liquid. It is, however, currently preferred to employ organic compounds that are liquid at temperatures in the range of 25° C. to 35° C. The currently preferred compounds are hydrocarbons. Some typical examples include heptane, pentane, 2,3-dimethylpentane, hexane, benzene, toluene, xylene, and ethyl benzene. It is currently preferred to use a combination of aromatic and paraffinic hydrocarbons, i.e., heptane and toluene.

The results obtained will vary depending upon the specific extraction liquid employed. For the preferred heptane/toluene mixture the toluene generally would account for about 2.5 to 75 weight percent of the liquid. More preferably, the toluene would be about 30 to about 60 weight percent of the liquids.

After the extraction is conducted the solid is separated from the liquid. In order to maximize the removal of soluble components it is preferred to carry out the extraction with the liquid at a temperature greater than 30° C. Most preferably the separation is made while the liquid is still at about the same temperature that was used in the extraction. The solids can be removed from the liquid using any suitable conventional technique. Examples include decanting and filtering. Typically it is preferred that the separation be conducted under such conditions that at least 10 weight percent of the aluminum is removed from the solid, still more preferably at least 25 weight percent, and most preferably about 35 to 50 weight percent.

The resulting solid can be used as a catalyst. Preferably, however, it would be washed moderately with an organic liquid, for example a paraffinic or aromatic hydrocarbon. Generally the washing can be carried out at normal ambient temperature, e.g., 20° C. to 35° C., although elevated temperature can be employed.

In the currently most preferred embodiment a polymerization active transition metal compound as described above is included in the extraction mixture.

Although many transition metal compounds of the formula given above can be employed, it is currently preferred to employ liquid titanium tetrachloride. The additional transition metal compound is generally employed in such an amount that the total transition metal, including that in the ground solid, would be equal to about 1 to about 20 weight percent of the solid, more preferably about 2 to about 10 weight percent.

When used in the extraction liquid the amount of transition metal compound in the liquid would generally be in the range of about 1 to about 20 weight percent based on the weight of the liquid, more preferably about 5 to 15 weight percent.

Typically this contacting of solid with additional transition metal would be conducted at a temperature in the range of 30° C. to 120° C., which is below the boiling point of the components of the slurry. It is currently preferred to use a temperature in the range of about 70° C. to about 100° C., more preferably about 90° C. to 100° C. The length of contacting for optimum results can be readily determined by routine experimental. Currently, it is preferred to carry out the contacting for about 1 to about 3 hours, more typically about two hours. After that the solid and the liquid are separated, preferably while the liquid is hot, and most preferably at about the same temperature used in the contacting.

If desired, the contacting with the transition metal containing liquid and the separation can be repeated one or more times. The recovered solid can be used as recovered; however, it is generally preferred to wash it with an organic liquid until substantially all free transition metal compound has been washed off the solid. The wash liquid can be any suitable organic liquid, typically a paraffinic or aromatic hydrocarbon. Examples include heptane, hexane, xylenes and toluene.

In the currently most preferred embodiment the solid is subjected to at least two separate extractions with fresh portions of the transition metal-containing aromatic/paraffinic mixture. Hydrocarbon washing between the extractions is not absolutely necessary but is currently preferred.

It is also within the scope of the present invention to carry out the extraction with an organic liquid which is free of transition metal and then to contact the resulting solid with a hot organic liquid containing an active transition metal compound. Examples of suitable organic liquids include any of those set forth above as being suitable for use in forming the extraction liquid. Either a single liquid compound or a mixture of compounds forming a liquid can be employed. The amount of transition metal in the liquid would be as described above for the transition metal-containing extraction liquid.

The solid obtained from the above-described embodiments can be used directly as a catalyst, but more typically is stored in an organic liquid of the type generally used in the polymerization of olefins. Some typical examples of such liquids include hexane, heptane, and mineral oil. Paraffinic hydrocarbons are particularly preferred.

The catalyst component produced by the foregoing methods is preferably used in conjunction with a cocatalyst of an organometallic compound and optimally another organic electron donor when it is desired to produce stereoregular polyolefins. The organometallic co-catalyst is selected from the group consisting of the alkyl aluminums, the alkyl aluminum halides and the alkyl aluminum hydrides. The preferred co-catalyst is triethyl aluminum, triisobutyl aluminum or diethyl aluminum chloride, with triethyl aluminum especially preferred. The molar ratio of organometallic co-catalyst to titanium-containing catalyst component, preferably moles of triethyl aluminum to gram-atoms of Ti in the catalyst component of the present invention may range up to about 400 to one. In laboratory liquid pool polymerization the range of about 150–300 to one is preferred, with about 240 to one especially preferred. In continuous production processes, a range of about 30–100 to one is presently believed to be preferred.

The electron donor for use in the cocatalyst is selected from the same group as the electron donors described for making the catalyst component and may be the same or different therefrom. Preferred electron donors are selected from the esters of aromatic acids such as ethyl anisate, methyl p-anisate, methyl p-toluate or ethyl benzoate. The most preferred electron donor is methyl p-toluate. The preferred molar ratio of organometallic co-catalyst to electron donor component, preferably moles of triethyl aluminum to moles of methyl p-toluate of the present invention is about 1.0–20.0 to one, most preferably about 2.0–3.5 to one.

In an especially preferred use of the catalyst the cocatalyst comprises an organoaluminum compound as described above, a silicon compound of the general formula

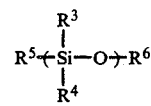

wherein $R^3$, $R^4$ and $R^5$ are each a hydrocarbon radical having 1 to 24 carbon atoms, alkoxy, hydrogen, or halogen, $R^6$ is a hydrocarbon radical having 1 to 24 carbon atoms and q is $1 \leq q \leq 30$; and another electron donor which is capable of forming a complex with the organoaluminum compound.

Examples of the above-mentioned silicon compounds include monomethyl tri-methoxy silane, monomethyl triethoxy silane, monomethyl tri-n-butoxy silane, monomethyl tri-sec-butoxy silane, monomethyl triisopropoxy silane, monomethyl tripentoxy silane, monomethyl trioxtoxy silane, monomethyl tristearoxy silane, monomethyl triphenoxy silane, dimethyl dimethoxy silane, dimethyl diethoxy silane, dimethyl diisopropoxy silane, dimethyl diphenoxy silane, trimethyl monomethoxy silane, trimethyl monoethoxy silane, trimethyl monoisopropoxy silane, trimethyl monophenoxy silane, monomethyl dimethoxy monochlorosilane, monomethyl diethoxy monochlorosilane, monomethyl diethoxy monochlorosilane, monomethyl diethoxy monobromosilane, monomethyldiphenoxy monochlorosilane, dimethyl monoethoxy monochlorosilane, monoethyl trimethoxy silane, monoethyl triethoxy silane, monoethyl triisopropoxy silane, monoethyl triphenoxy silane, diethyl dimethoxy silane, diethyl diethoxy silane, diethyl diphenoxy silane, triethyl monomethoxy silane, triethyl monoethoxy silane, triethyl monophenoxy silane, monoethyl dimethoxy monochlorosilane, monoethyl diethoxy monochlorosilane, monoethyl diphenoxy monochlorosilane, monoisopropyl trimethoxy silane, mono-n-butoxy trichlorosilane, monomethoxy trichlorosilane, monooctoxy trichlorosilane, monostearoxy trichlorosilane, monophenoxy trichlorosilane, mono-p-methyl phenoxy trichlorisilane, dimethoxy dichlorosilane, diethoxy dichlorosilane, diisopropoxy dichlorosilane, di-n-butoxy dichlorosilane, dioctoxy dichlorosilane, trimethoxy monochlorosilane, triethoxy monochlorosilane, triisopropoxy monochlorosilane, tri-n-butoxy monochlorosilane, tri-sec-butoxy monochlorosilane, tetraethoxy silane, tetraisopropoxy silane, as well as chain or cyclic polysiloxanes having a recurring unit represented by the formula

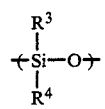

obtained by condensation of the compounds exemplified above. Particularly, silicon compounds of the foregoing general formula wherein q=1 are preferred. More preferable silicon compounds are those represented by the general formula $R'_mSi(OR'')_nX_{4-m-n}$ wherein R' and R" are each a hydrocarbon radical having 1 to 24 carbon atoms, X is a halogen atom, m is $0 \leq m < 4$ and n is $0 < n \leq 4$, provided $0 < m+n \leq 4$.

Examples of electron donors capable of forming complexes with organoaluminum compounds include alkyl and aryl esters of aromatic carboxylic acids, such as, for example, benzoic, toluic, p-methoxybenzoic and phthalic acids. Some representative examples include ethyl benzoate, ethyl p-toluate, n-octyl phthalate, methyl p-toluate, diisobutyl phthalate, methy para anisate. Other examples include ethers such as anisole, phosphites such as triethyl-phosphite, and compounds such as tri-allyl-isocyanurite.

An especially preferred cocatalyst composition of the combination of a trialkyl aluminum, a hydrocarbyl trialkyoxy silane, and an alkyl ester of an aromatic carboxylic acid. Some typical examples include the combination of triethylaluminum and phenyl triethoxy silane with methyl para toluate, or methyl para anisate, or ethyl benzoate. Typically the molar ratio of the silane donor to the other donor will be in the range of about 0.3/1 to about 1.5/1 and the molar ratio of the alkyl aluminum compound to the total electron donors would generally be in the range of about 2/1 to 3.5/1.

A catalyst produced by the foregoing method may be used in standard methods for polymerization of alpha-olefins. The catalyst may be used in liquid pool, inert solvent or gas phase preparations. When so used, the preferred catalyst of the present invention produce polypropylene having an isotactic index of at least 80, more preferably 90, and most preferably 93 or greater, a total ash content of not more than about 700 ppm, but more preferably as low as about 300 ppm, and a magnesium residue of less than about 20 ppm.

Olefin polymerizing conditions generally involve temperature in the range of 20° C. to 120° C., more typically 50° C. to 100° C., and pressures in the range of atmospheric to 70 kg/cm², more typically in the range of 2 to 60 kg/cm².

The preferred means of using the catalyst of the present invention is in liquid pool polymerization. When so used, in the preparation of polypropylene, the expensive steps of polymer extraction, polymer deashing and the associated solvent recovery are eliminated.

Accordingly, one or more olefins having from about 2 to 18 carbon atoms may be polymerized according to the present invention. Examples of such olefins are ethylene, propylene, 1-butene, 1-pentene, 1-hexene, 1-heptene, 1-octene, 1-nonene, 1-decene, 4-methyl-1-pentene, 4-methyl-1-hexene, 5-methyl-1-hexene, 4,4-dimethyl-1-pentene, 4-methyl-1-heptene, 5-methyl-1-heptene, 6-methyl-1-heptene, and 4,4-dimethyl-1-hexene. Such 1-olefins may be copolymerized with monomers copolymerizable therewith such as vinyl acetate and lower alkyl ($C_1$ to $C_{12}$ alkyl) acrylic esters. Particularly preferred olefins which are intended to be polymerized according to the present invention are ethylene, propylene, 1-butene and 1-hexene.

In the following examples, the titanium-containing solid product that is subjected to treatment with various liquids is the product of the co-comminution of anhydrous magnesium chloride, aluminum trichloride, ethyl benzoate, anisole, and $TiCl_4$. A typical procedure which can be used for making such a solid involves cogrinding the components in a nitrogen purged 125 liter Vibratom mill containing 0.3470 pounds of 1.0" dia. steel balls. To the mill there is charged about 68.75 pounds of anhydrous $MgCl_2$ and about 12.02 pounds of $AlCl_3$. The mixture is milled for 16 hours at 28°-32° C. Then while the milling at 28°-32° C. is continued, about 20.35 pounds of ethyl benzoate is added to the mixture uniformly over a 1 hour period. The resulting mixture is then milled for an additional two hours at 28°-32° C. Then while the milling at 28°-32° C. is continued, about 12.13 pounds of anisole is added to the mixture uniformly over about ¾ of an hour. The milling is then continued at the same temperature for about 2¼ hours. Then while the milling continues at that same temperature about 8.75 pounds of $TiCl_4$ is added uniformly during 30 minutes. The mixture is then milled for about 15½ hours more. The resulting solid is then recovered from the mill and screened to remove the +20 mesh course material. Catalysts prepared using the general technique will be referred to below as base catalysts.

EXAMPLE I

A base catalyst, Catalyst A, was employed in the polymerization of propylene using a cocatalyst comprising triethylaluminum (TEA) and methyl-p-toluate (MPT) at mole ratios of 3/1 and 3.4/1.

A Catalyst B was prepared by forming a 50/50 weight ratio slurry of Catalyst A in heptane. The mixture was agitated and 15.7 weight % $TiCl_4$ based on the heptane was added. The mixture was heated to 90°-95° C. and agitated for several hours. After the heating period the slurry was cooled rapidly. Once the slurry had cooled to about ambient temperature the liquid was removed by decanting to leave a solid Catalyst B. The relative effectiveness of these catalysts in the polymerization of propylene was as follows:

TABLE I

| Catalyst | Productivity kg/y/hr | II % | B.D. |
|---|---|---|---|
| A* | 9.7 | 92.3 | 0.34 |
| A | 10.6 | 92.0 | 0.34 |
| B | 11.4 | 94.2 | 0.43 |

*TEA/MPT = 3.4/1 (the other runs used TEA/MPT = 3.1/1)

These results demonstrate that as taught by EPC application 101,615 the treatment of the base catalyst with $TiCl_4$ can increase the activity, II%, and bulk density of the polymer.

EXAMPLE II

This example sets forth a comparison of the polymerization results obtained using another base catalyst, referred to here as Catalyst C.

In one procedure a portion of Catalyst C was washed and filtered nine times at 90° to 95° C. with heptane and then vacuum dried to give a Catalyst D.

In another procedure a portion of Catalyst D was suspended in heptane to give a slurry containing 50 weight percent Catalyst D. The mixture was agitated and 15.7 weight % TiCl₄, based on the weight of the heptane, was added. The mixture was then heated to 90°-95° C. and agitated for several hours. The slurry was then rapidly cooled and then the liquid decanted off to give Catalyst E.

In yet another procedure a portion of base Catalyst C was washed once with heptane at 90°-93° C. and the solid removed from the liquid by filtering at 90°-93° C. The resulting solid was then contacted with TiCl₄ in the same manner as used in main Catalyst D. The resulting solid is referred to here as Catalyst F.

The relative effectiveness of these catalysts in the polymerization of propylene was as follows:

TABLE II

| Catalyst | Productivity kg/y/hr | II % | B.D. |
|---|---|---|---|
| C* | 10 | 92.5 | 0.33 |
| D* | 10.7 | 92.9 | 0.44 |
| E | 13.4 | 94.0 | 0.45 |
| F | 13.4 | 93.7 | 0.42 |

*TEA/MPT = 3.4/1 (the other runs used TEA/MPT = 3.1/1)

A comparison of the results obtained with Catalysts C and D reveals that even without the TiCl₄ activation the extraction improves the activity of the catalyst to some degree. The combination of extraction with TiCl₄ activation (Catalysts E and F) results in productivities that are at least about 1000 kg/g higher than those provided by Catalyst B of Example I.

Several other catalysts were prepared using the general techniques used in making Catalyst F except that isooctane, cyclohexane, or 2,3-dimethylpentane were employed. The 2,3-dimethylpentane gave results similar to that obtained with the heptane. The other solvents apparently were not as effective in extracting the aluminum components. They gave results similar to those obtained with Catalyst B of Example I.

EXAMPLE III

In order to evaluate the effect of using an aromatic/paraffin extraction a series of catalysts were made using different extraction techniques on a Base Catalyst G prepared using a technique generally of the type described above.

The catalysts were prepared in clean 100 ml or one pint size septum bottles which had been thoroughly dried. Inside the dry box, 15-30 grams of Base Catalyst G and a clean magnetic stirring bar were loaded into the bottle. The bottle was capped and filled with the required amount of TiCl₄ and liquids by means of a syringe or a cannula transfer needle. The mixture was heated with a hot bath and kept at 95°-100° C. while stirring for several hours.

The recovered solids were moderately washed with 75-150 ml of room temperature heptane and then slurried in heptane.

In one of the preps a double activation/extraction was used. Each extraction involved heating for 2 hours at 95°-100° C. A 50 ml room temperature heptane wash was carried out between the two extractions.

The resulting catalysts were then evaluated for use in the polymerization of propylene.

A 1-gallon Autoclave Engineers, Inc. reactor was used. the reactor was conditioned prior to each polymerization by filling with 2 liters heptane and heating to 176° C. for 15 minutes. The heptane was drained hot and the reactor cooled to room temperature with tap water through the jacket. Under a propylene purge, the reactor was sequentially charged with TEA, MPT, and catalyst. The mole ratio of TEA to MPT was about 3/1. The reactor was sealed and hydrogen was added by measuring the pressure drop from a 300 ml vessel. About 3-liters of propylene was metered into the reactor and the contents stirred while being heated from room temperature to 70° C. Meanwhile, the propylene reservoir was heated to achieve a 600 psi vapor pressure. Propylene was slowly added to the reactor while maintaining 69°-71° C. temperature. When the reactor was full, the propylene feed was left open and polymerization temperature was kept at 70° C. for one hour, unless otherwise specified.

At the end of the run, the propylene feed was cut off while some propylene was drained down the bottom of the reactor where it is collected in a preweighed 1-gallon can. This makes room for the addition of 5 ml methanol, injected into a holding vessel and carried to the reactor through the propylene feed. Finally, all of the propylene was drained down the bottom of the reactor, followed by a 2-liter propylene used in washing the polymer. The liquid propylene was evaporated and, after drying in a vacuum oven, the soluble polymer was measured. The polypropylene was stabilized and then dried in a vacuum oven. Productivity was based on the total polymer (kg of polymer/g of solid catalyst/hr).

Some of the dried polymer was extracted exhaustively with hot heptane and the isotactic index (II) was calculated, which includes the previously measured propylene solubles.

The results are summarized in Table III.

TABLE III

| Catalyst | Solvent | Productivity (kg/g/hr) | II (%) | Melt Flow (g/10 min) |
|---|---|---|---|---|
| H | 100% Heptane | 11.8 | 93.8 | 5 |
| I | 2.5% Toluene/97.5% Heptane | 11.8 | 93.7 | 4 |
| J | 50% Toluene/50% Heptane | 14.3 | 94.0 | 3 |
| K | 100% Toluene | 12.4 | 94.9 | 4 |
| L | 50% Toluene/50% Heptane "Double Activation" | 16.4 | 93.7 | 3 |

The results show that a mixture of toluene and heptane as the extraction solvent can give a better result than either 100% heptane or 100% toluene. The 100% toluene appeared to be somewhat more effective as an extraction solvent than the 100% heptane as reflected by the higher productivity it provided. The double activation technique provided an even greater improvement in activity.

EXAMPLE IV

A similar experiment was made in which a series of catalysts were made at a six fold increase in scale.

The results obtained are summarized in the Table IV.

TABLE IV

| Solvent (% Toluene) | Productivity* (kg/g/hr) | II (%) | Polymer Bulk Density (g/cc) |
|---|---|---|---|
| 20 | 12.9 | 94.3 | 0.38 |
| 30 | 12.9 | 94.9 | 0.42 |
| 50 | 12.2 | 94.9 | 0.42 |
| 75 | 10.7 | 95.0 | 0.42 |
| 100 | 10.2 | 94.4 | 0.38 |

TABLE IV-continued

| Solvent (% Toluene) | Productivity* (kg/g/hr) | II (%) | Polymer Bulk Density (g/cc) |
|---|---|---|---|
| 40 "Double Activation" | 15.1 | 94.1 | 0.45 |

These results show that the optimum balance of productivity/II/bulk density was obtained using 30 to 50 weight percent toluene in the extraction liquid.

EXAMPLE V

Another set of catalysts were prepared using different techniques of treating the base catalyst. First, a catalyst was prepared by placing 10 grams of the base catalyst in a flask in a dry box. Then 100 ml of $TiCl_4$ was added and the resulting slurry was stirred for 2 hours at 80°–85° C. While the mixture was hot the solid was separated from the liquid by filtering. A portion of the recovered solid was contacted with another 100 ml of $TiCl_4$ and heated and filtered, and then dried to give Catalyst M.

Another portion of the solid prepared as described in the preceding paragraph was washed 5 times with heptane at 80°–85° C. using 140 ml per wash to give Catalyst N.

Another 20 grams of the base catalyst was subjected to a double extraction using a 40/60 weight mixture of toluene/heptane containing about 3.7 weight percent $TiCl_4$ based on the weight of the organic extraction liquids. The extraction involved heating at 95°–100° C. for 2 hours and filtering while hot. A portion of the solid was dried to give Catalyst O.

Another portion of the solid used to make Catalyst O was washed and filtered with 80° C. heptane. The recovered solid was dried to give Catalyst P.

Still another portion of the solid used in making Catalyst O was washed and filtered 4 times with 80° C. heptane. The recovered solid was dried to give Catalyst Q.

Portions of each of the catalysts were analyzed for Ti, Mg, and Al content using plasma emission of catalyst samples dissolved in 1.8M $H_2SO_4$. The results are as follows:

TABLE V

| Catalyst | Weight % | | |
|---|---|---|---|
| | Ti | MG | Al |
| Base | 1.99 | 16.46 | 2.06 |
| M | 6.71 | 19.97 | 0.31 |
| N | 2.81 | 20.78 | 0.31 |
| O | 2.79 | 19.76 | 0.83 |
| P | 2.39 | 20.09 | 0.75 |
| Q | 2.22 | 20.60 | 0.69 |

The performance of the catalysts in the polymerization of propylene were made using triethylaluminum (TEA) and either methyl para toluate (MPT), phenyl triethyoxy silane (PTES) or a mixture of MPT and PTES. The results are given in Tables VI, VII, and VIII.

TABLE VI

| Catalyst | Productivity (g/g/hr) | Melt Flow | II (%) | Solubles (%) $C_3=$ | Xyl. | Polymer B.D. | Flex. Mod. |
|---|---|---|---|---|---|---|---|
| M | 17,370 | 7.7 | 85.2 | 3.1 | 4.1 | 0.33 | 1487 |
| N | 13,633 | 6.3 | 88.3 | 2.2 | 4.2 | 0.43 | 1389 |
| N* | 10,746 | 2.9 | 90.1 | 2.8 | 3.1 | 0.37 | 1591 |
| O | 17,708 | 5.0 | 90.8 | 1.7 | 3.4 | 0.42 | 1556 |
| P | 16,663 | 5.6 | 91.2 | 2.0 | 3.2 | 0.41 | 1488 |
| P* | 13,432 | 2.4 | 92.9 | 1.6 | 2.9 | 0.45 | 1604 |
| Q | 16,439 | 3.3 | 92.1 | 0.6 | 3.2 | 0.46 | 1489 |

*These runs used TEA/MPT of 3.1/1 (the others used 3.3/1)

TABLE VII

| Catalyst | Productivity (g/g/hr) | Melt Flow | II (%) | Solubles (%) $C_3=$ | Xyl. | Polymer B.D. | Flex. Mod. |
|---|---|---|---|---|---|---|---|
| M | 16,652 | 12.9 | 75.0 | 2.6 | 3.2 | 0.32 | 1087 |
| N | 20,515 | 15.8 | 81.0 | 2.9 | 8.2 | 0.40 | 1219 |
| N* | 17,955 | 8.3 | 81.0 | 1.4 | 10.2 | 0.41 | 1108 |
| O | 16,222 | 8.0 | 80.9 | 1.5 | 9.6 | 0.41 | 1148 |
| P | 16,412 | 9.6 | 80.7 | 2.5 | 8.8 | 0.42 | 1156 |
| Q | 16,412 | 10.3 | 80.3 | 2.8 | 9.0 | 0.41 | 1105 |

*This run used TEA/PTES of 2.7/1.0 (the others used 3.1/1.0).

TABLE VIII

| Catalyst | Productivity (g/g/hr) | Melt Flow | II (%) | Solubles (%) $C_3=$ | Xyl. | Polymer B.D. | Flex. Mod. |
|---|---|---|---|---|---|---|---|
| M | 19,243 | 12.9 | 88.6 | 2.1 | 3.4 | 0.34 | 1677 |
| M* | 16,181 | 9.3 | 90.8 | 2.0 | 3.1 | 0.33 | 1612 |
| N | 20,607 | 13.1 | 90.0 | 1.4 | 3.9 | 0.43 | 1526 |
| O | 19,890 | 8.5 | 91.6 | 1.6 | 2.9 | 0.42 | 1505 |
| P | 20,948 | 7.8 | 92.6 | 0.5 | 3.5 | 0.45 | 1457 |
| Q | 17,710 | 9.5 | 91.8 | 1.7 | 2.8 | 0.42 | 1520 |

*This run used TEA/MPT/PTES of 4.8/1.2/1.0 (the others used 4.8/1.0/1.0)

Typically, a catalyst is viewed as performing better if its productivity is higher at equivalent II or vice versa, or if both productivity and II are higher. Table VI shows that invention catalysts O–Q give a better overall balance of productivity/II/bulk density. A comparison of Tables VI–VIII shows that in all catalysts, the use of a mixed MPT/PTES gives a superior performance compared to the use of either MPT or PTES alone.

Comparative Catalyst M obviously carried a significant amount of soluble titanium and as a result it gave a lower %II than the other catalysts with each cocatalyst system.

Comparison Catalyst N, i.e., the catalyst resulting after soluble Ti had been washed off Catalyst M, gave somewhat higher %II but gave lower productivity except when used with the TEA/MPT/PTES cocatalyst system.

The %II obtained with Invention Catalysts O, P, and Q was better or about the same as that of Comparative Catalyst N. A comparison of the results for O-P also show that extensive washing after the extraction step does not result in any significant improvement in the catalyst.

What is claimed is:

1. A process for preparing a catalyst suitable for use in the polymerization of olefins comprising
   (1) co-comminuting an aluminum halide; at least one electron donor; a Group IVB–VIB transition metal compound; and a support base selected from the group consisting of the Group IIA and IIIA salts and the salts of the multivalent metals of the first transition series with the exception of copper to produce a coground solid;

(2) extracting said coground solid with an organic liquid; and (3) separating the solid from the liquid under such conditions that at least 5 weight percent of the aluminum in the coground solid is removed, characterized in that the extraction and the separation are conducted at a temperature below the boiling point of the lowest boiling portion of the organic liquid used in the extraction but in the range of about 70° C. to about 100° C.

2. A process according to claim 1 wherein said aluminum halide is aluminum trichloride and said support base is magnesium dichloride.

3. A process according to claim 2 wherein said transition metal compound is $TiCl_4$.

4. A process according to claim 3 wherein the molar ratio of $MgCl_2$ to $AlCl_3$ is in the range of 8/0.5 to 3, the molar ratio of $MgCl_2$ to electron donor is in the range of 8/0.5-3, and the molar ratio of the $MgCl_2$ to the $TiCl_4$ is in the range of 8/0.1-1.

5. A process according to claim 4 wherein said electron donor is selected from aromatic ethers and esters of aromatic acids.

6. A process according to claim 5 wherein said electron donor is selected from anisole and ethyl benzoate.

7. A process according to claim 6 wherein the molar ratio of $MgCl_2$ to anisole is in the range of 8/1-1.5 and the molar ratio of $MgCl_2$ to ethyl benzoate is in the range of 8/1-1.5.

8. A process according to claim 7 wherein the extraction liquid is a mixture of aromatic and paraffinic hydrocarbons.

9. A process according to claim 8 wherein the extraction liquid is a mixture of toluene and heptane.

10. A process according to claim 9 wherein $TiCl_4$ is included in the extraction liquid.

11. A process according to claim 7 wherein $TiCl_4$ is included in the extraction liquid.

12. A process according to claim 7 wherein the solid recovered from step (3) is contacted with additional $TiCl_4$.

13. A process according to claim 7 wherein the extraction and the separation are conducted at a temperature in the range of 90° C. to 100° C.

14. A catalyst prepared by the process of claim 1.
15. A catalyst prepared by the process of claim 7.
16. A catalyst prepared by the process of claim 11.
17. A catalyst prepared by the process of claim 10.
18. A catalyst prepared by the process of claim 9.

19. A process for preparing a catalyst suitable for use in the polymerization of olefins comprising
  (1) co-comminuting an aluminum halide; at least one electron donor; a Group IVB-VIB transition metal compound; and a support base selected from the group consisting of the group IIA and IIIA salts and the salts of the multivalent metals of the first transition series with the exception of copper to produce a coground solid;
  (2) extracting said coground solid with an organic liquid consisting essentially of a mixture of toluene and heptane wherein the toluene is about 30 to 60 weight percent of said liquid; and
  (3) separating the solid from the liquid under such conditions that at least 5 weight percent of the aluminum in the coground solid is removed.

20. A process according to claim 19 wherein said extraction and said separation are conducted at a temperature below the boiling point of the lowest boiling portion of the extraction liquid but in the range of 30° C. to about 120° C.

21. A process according to claim 20 wherein the extraction and separation are conducted under such conditions that at least 10 weight percent of the aluminum in the coground solid is removed.

22. A process according to claim 20 wherein the extraction and separation are conducted under such conditions that at least about 25 weight percent of the aluminum in the coground solid is removed.

23. A process according to claim 22 wherein the extraction and the separation are conducted at a temperature in the range of about 70° C. to about 100° C.

24. A process according to claim 22 wherein the extraction and the separation are conducted at a temperature in the range of about 90° C. to about 100° C.

25. A process according to claim 1 wherein the extraction and the separation are conducted at a temperature in the range of about 90° C. to about 100° C.

26. A catalyst prepared by the process of claim 19.

* * * * *